US012706616B2

(12) United States Patent
Taher et al.

(10) Patent No.: US 12,706,616 B2
(45) Date of Patent: Aug. 11, 2026

(54) CONFIGURABLE RADIO FREQUENCY FRONT-END TO SUPPORT TTC AND ISL SATELLITE LINKS

(71) Applicant: CesiumAstro, Inc., Austin, TX (US)

(72) Inventors: Tanim Taher, Round Rock, TX (US); Colton Martin, Austin, TX (US); Erik Luther, Round Rock, TX (US); James Carwell, Spicewood, TX (US)

(73) Assignee: CesiumAstro, Inc., Austin, TX (US)

( * ) Notice: Subject to any disclaimer, the term of this patent is extended or adjusted under 35 U.S.C. 154(b) by 34 days.

(21) Appl. No.: 17/961,675

(22) Filed: Oct. 7, 2022

(65) Prior Publication Data

US 2026/0142676 A1 May 21, 2026

(51) Int. Cl.
*H04B 1/00* (2006.01)

(52) U.S. Cl.
CPC ........... *H04B 1/0042* (2013.01); *H04B 1/006* (2013.01)

(58) Field of Classification Search
CPC ......... H04W 36/0033; H04W 36/0061; H04W 36/08; H04W 36/083; H04W 36/362; H04W 40/34; H04W 76/27; H04W 84/06
USPC ..... 455/552.1, 323, 509, 229, 73, 78, 127.3, 455/127.1, 41.2, 414.1, 415
See application file for complete search history.

(56) References Cited

U.S. PATENT DOCUMENTS 12,278,686 B2 * 4/2025 Dutta ................... H04B 7/2041
2005/0143005 A1 * 6/2005 Moore, III ......... H04B 7/18521 455/454
2009/0168848 A1 * 7/2009 Constantinidis ....... H04B 1/707 375/140
2009/0168849 A1 * 7/2009 Rouxel .................. H04B 1/707 375/140
2012/0020280 A1 * 1/2012 Jansson .............. H04B 7/18582 370/316
2018/0041270 A1 * 2/2018 Buer ................... H04W 56/001
2019/0109635 A1 * 4/2019 Buer .................... H04B 7/2041
2022/0182085 A1 * 6/2022 King ...................... H04B 1/126
2022/0247441 A1 * 8/2022 Cho .......................... H04L 5/14
2025/0055665 A1 * 2/2025 Buer ..................... H04L 5/1469

* cited by examiner

*Primary Examiner* — Joseph Arevalo
(74) *Attorney, Agent, or Firm* — Hogan Lovells Cadawalder US LLP

(57) ABSTRACT

In some implementations, a satellite may include a software-defined radio (SDR), antenna circuits, and front-end circuits. Each antenna circuit may include a first antenna and a second antenna. Each front-end circuit may be coupled between the SDR and one of the plurality of antenna circuits and may include a transmit path, a first receive path, and a second receive path. The transmit path may include an input coupled to an output of the radio and an output selectively coupled to the first antenna for ISL and TT&C transmissions. The first path includes an input to couple to the first antenna and an output to couple to the radio. The second path includes an input coupled to the second antenna and an output to couple to the radio. The front-end circuit may selectively enable one of the first or second receive paths for ISL or TT&C communications.

20 Claims, 6 Drawing Sheets

CONFIGURABLE RADIO FREQUENCY FRONT-END TO SUPPORT TTC AND ISL SATELLITE LINKS

FIELD

The present disclosure is generally related to satellite communications, and more particularly to configurable radio frequency front-end circuitry to support telemetry, tracking, and control (TT&C) and inter-satellite link (ISL) communications.

BACKGROUND

Conventional satellites may include TT&C antenna circuitry within the satellite bus that may enable satellite communication between the satellite and facilities on the ground. The TT&C subsystem is required for all satellites regardless of the application. The TT&C subsystem may enable communication of the health and status of the satellite through the collection, processing, and transmission of data from the various spacecraft subsystems; to determine the satellite's exact location through the reception, processing, and transmitting of ranging signals; and to control the satellite through the reception, processing, and implementation of commands transmitted from the ground.

Such satellites may include separate intersatellite link (ISL) antenna circuitry to enable ISL communications, which may be used to improve the positioning accuracy and to provide precise pseudo-range measurements between satellites in a specific constellation. ISLs may also enable intersatellite communications of information to form a constellation of satellites to provide a communications network. However, the TT&C subsystem and the ISL subsystem both occupy real estate within the housing of the satellite, where real estate is limited; and where size, weight, power and cost (SWaPC) concerns for any extra subsystem are paramount.

SUMMARY

Embodiments of systems, methods, and circuits described herein may include a radio frequency (RF) front-end that is software programmable to provide both telemetry, tracking, and control (TT&C) functionality and intersatellite link (ISL) functionality. By enabling both functions within the same circuitry, the amount of real estate occupied by the TT&C and ISL circuitry may be reduced relative to conventional systems; which also means lesser SWaPC concerns.

In some implementations, a satellite may include a software-defined radio (SDR), a plurality of antenna circuits, and a plurality of front-end circuits. The SDR may be configured to provide data for transmission and to process received data. Each antenna circuit may include a first antenna configured to send and receive signals within a first frequency band and may include a second antenna configured to receive signals within a second frequency band. Each front-end circuit may be coupled between the SDR and one of the plurality of antenna circuits. Each front-end circuit may include a switch, a transmit path, a first receive path, a second receive path, and a multiplexer. The switch may include a first node and a second node and may include a third node coupled to the first antenna. The transmit path may be configured to couple an output of the SDR to the first node. The first receive path may include an input coupled to the second node and may include a first output. The second receive path may include an input coupled to the second antenna and may include a second output. The multiplexer may include a first input coupled to the first output, a second input coupled to the second output, and an output coupled to the SDR. The switch and the multiplexer may be controlled to configure the front-end circuit to provide one of intersatellite link (ISL) communications or telemetry, tracking, and control (TT&C) communications.

In other implementations, a satellite may include a software-defined radio (SDR), a plurality of antenna circuits, and a plurality of front-end circuits. The SDR may be configured to provide data for transmission and to process received data. Each antenna circuit may include a first antenna and a second antenna. Each front-end circuit may be coupled between the SDR and one of the plurality of antenna circuits. Each front-end circuit may include a transmit path, a first receive path, and a second receive path. The transmit path may include an input coupled to an output of the SDR and an output configured to couple to the first antenna. The first receive path may include an input configured to couple to the first antenna and an output configured to couple to the SDR. The second receive path may include an input coupled to the second antenna and may include an output configured to couple to the SDR. The front-end circuit may be configured to selectively enable one of the first receive path for intersatellite link (ISL) communications or the second receive path for telemetry, tracking, and control (TT&C) communications. The transmit path may be used for both ISL and TT&C transmissions—where software controls the selected mode of operation.

In still other implementations, a satellite may include a signal processing circuit and an antenna circuit including a first antenna configured to send and receive signals within a first frequency band and a second antenna configured to receive signals within a second frequency band. The satellite may include a front-end circuit including a transmission path, a first receive path, a switch, a multiplexer, and a second receive path. The transmission path may include a first amplifier including an input coupled to an output of the signal processing circuit and including an output and may include a first filter including an input coupled to the output of the first amplifier and including an output. The first receive path may include a second amplifier including an input and including an output and may include a second filter including an input coupled to the output of the second amplifier and including an output. The switch may include a first node coupled to the output of the first filter, a second node coupled to the input of the second amplifier, and a third node coupled to the first antenna. The multiplexer may include a first input coupled to the output of the second filter, a second input, and an output coupled to an input of the signal processing circuit. The second receive path may include a third amplifier including an input coupled to the second antenna and including an output and may include a third filter including an input coupled to the output of the third amplifier and including an output coupled to the second input of the multiplexer. The switch and the multiplexer may be controlled to selectively disable one of the first receive path or the second receive path to provide one of a telemetry, tracking, and control (TT&C) mode or an intersatellite link (ISL) mode.

BRIEF DESCRIPTION OF THE DRAWINGS

The detailed description is set forth with reference to the accompanying figures. In the figures, the left most digit(s) of a reference number identifies the figure in which the reference number first appears. The use of the same reference numbers in different figures indicates similar or identical items or features.

While implementations are described in this disclosure by way of example, those skilled in the art will recognize that the implementations are not limited to the examples or figures described. The figures and detailed description thereto are not intended to limit implementations to the form disclosed, but on the contrary, the intention is to cover all modifications, equivalents, and alternatives falling within the spirit and scope as defined by the appended claims. The headings used in this disclosure are for organizational purposes only and are not meant to limit the scope of the description or the claims. As used throughout this application, the word "may" is used in a permissive sense (in other words, the term "may" is intended to mean "having the potential to") instead of in a mandatory sense (as in "must"). Similarly, the terms "include," "including," and "includes" mean "including, but not limited to."

DETAILED DESCRIPTION OF ILLUSTRATIVE EMBODIMENTS

Embodiments of systems, methods, and circuits are described below that include a programmable transmit/receive module that may be switched between an intersatellite link (ISL) communication mode and a telemetry, tracking, and control (TT&C) mode. In the ISL mode, the selected antennas may be configured for bi-directional communication with other satellites in orbit. A group of such satellites that communicate with one another via ISL links may form a constellation of satellites that communicate with one another. In the TT&C mode, the selected antennas may be configured for bi-directional communication with a ground-based station or dish, which may be coupled to terrestrial networks, such as the Internet.

In some implementations, the system may include a transceiver module that may include a pair of antennas that may be configured to operate in the S-band, which is a designation by the Institute of Electrical and Electronics Engineers (IEEE) for a part of the microwave band of the electromagnetic spectrum covering frequencies from 2 to 4 gigahertz (GHz). The transceiver circuitry associated with the S-band antennas may be programmable to switch between the TT&C mode and the ISL mode.

Figure 1:
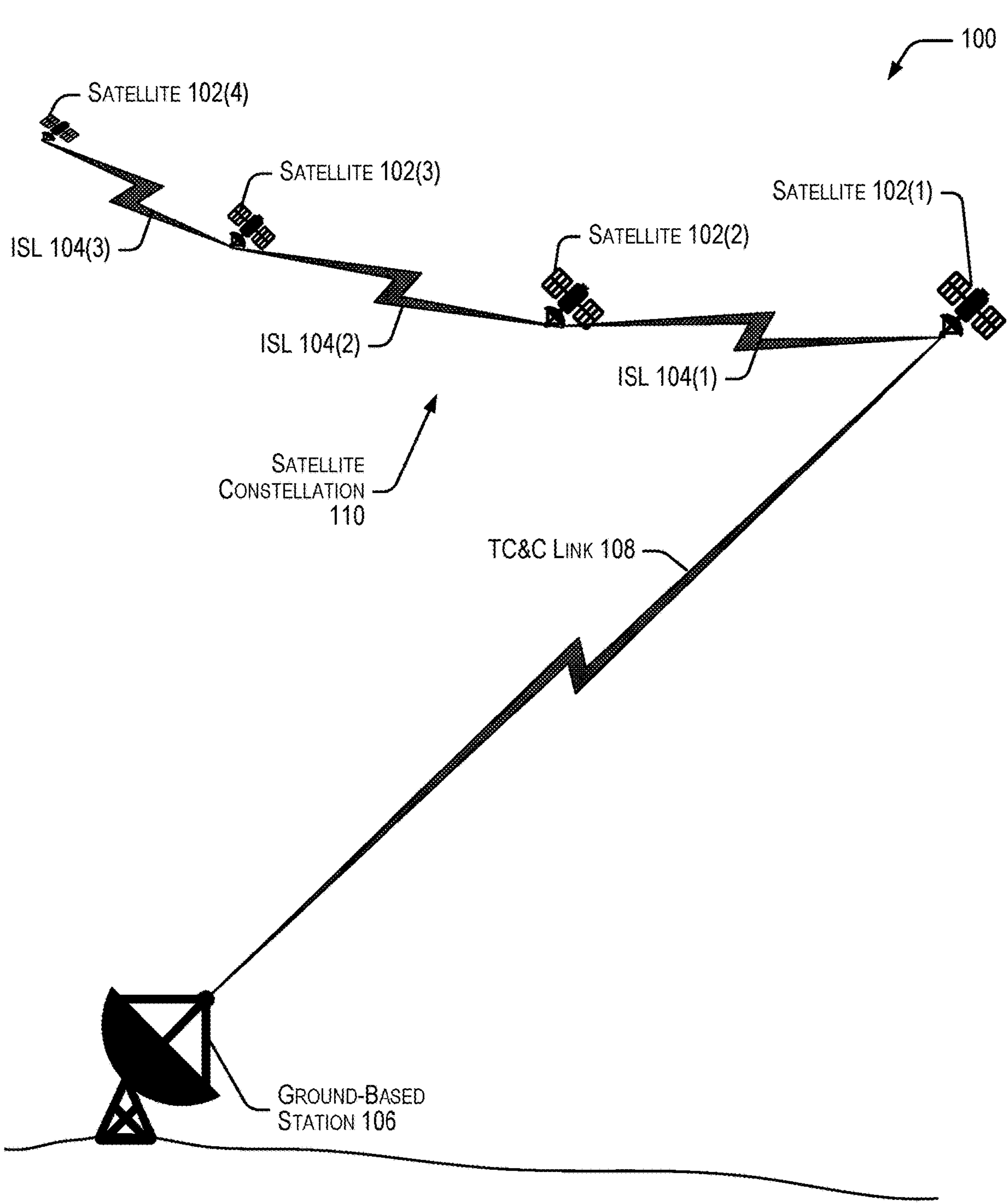
FIG. 1 depicts a diagram of a system including a plurality of satellites configured to provide a satellite constellation with intersatellite links (ISL) and with a single telemetry, tracking, and control (TT&C) link from one of the satellites to a ground base station, in accordance with certain embodiments of the present disclosure.

FIG. 1 depicts a diagram of a system 100 including a plurality of satellites 102 configured to provide a satellite constellation 110 with intersatellite links (ISL) 104 and with a single telemetry, tracking, and control (TT&C) link 108 from one of the satellites 102(1) to a ground base station 108, in accordance with certain embodiments of the present disclosure. In the illustrated example, the system 100 may include any number of satellites 102 configured to communicate with one another using ISLs 104 to form the satellite constellation 110 to provide a mesh communications network. In this example, one or more of the satellites 102 may be configured to communicate with the ground base station 108 using a TC&C link 108.

In some implementations, the TT&C link 108 may enable relatively long range, low noise communications, while the ISLs 104 may be shorter range communications paths between satellites 102. In some implementations, each satellite may include programmable transceiver modules, where each transceiver module is coupled to a pair of s-band antennas that may be configured to enable one of TT&C communications between the satellite 102 and a ground base station 108 or configured to enable ISLs 104. In some implementations, the ISL 104 may utilize time-division duplex (TDD) intersatellite communication.

The programmability of the transceiver modules may enable smaller circuit configurations since the transmit antenna may be shared between the ISL and TT&C modes. The smaller circuit configurations may enable multiple transceiver modules the increase the three-dimensional 4pi-steradian coverage easily with more antennas spaced around the housing of the satellite 102.

Figure 2:
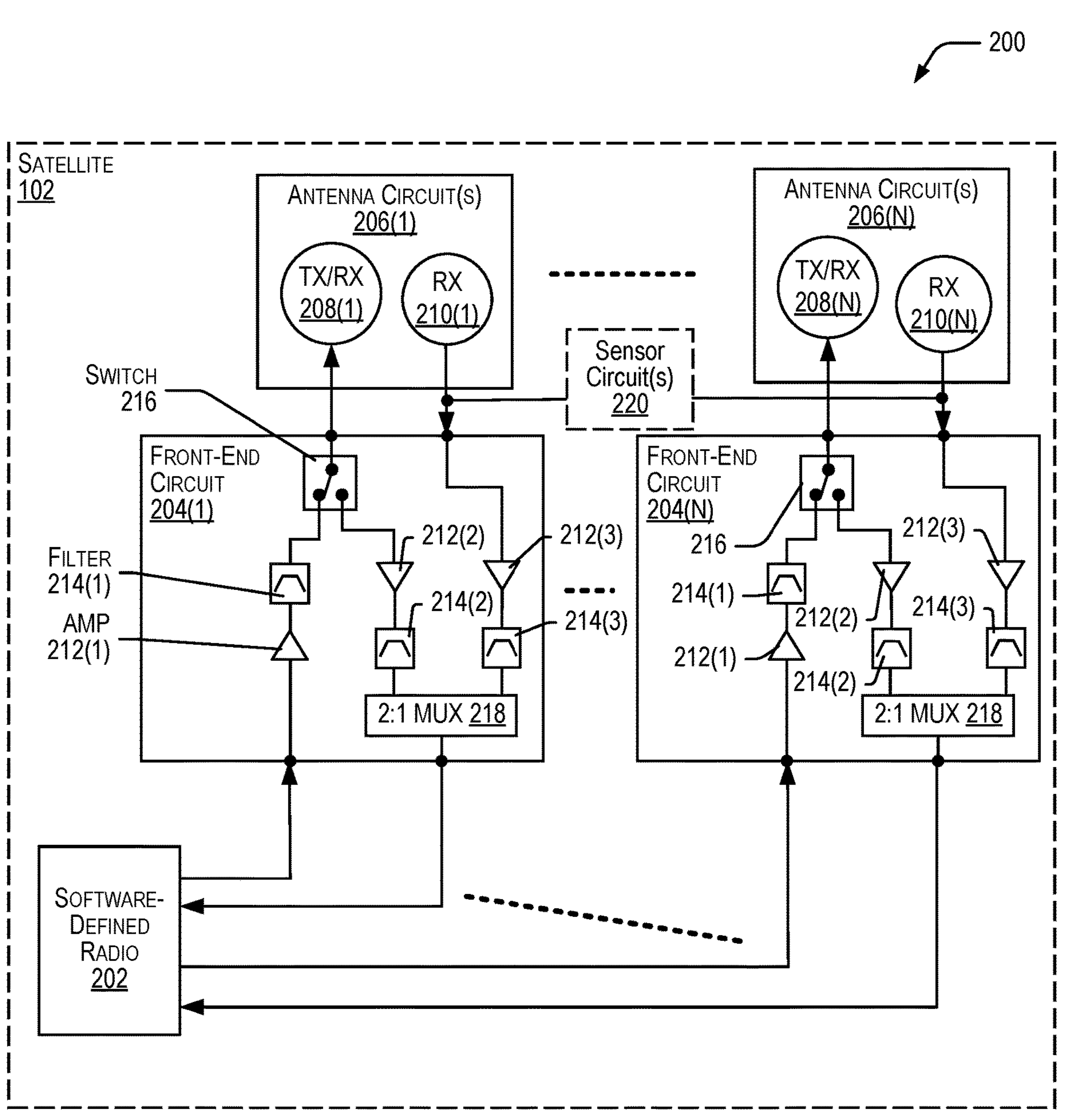
FIG. 2 depicts a diagram of a system including one of the satellites of the system of FIG. 1 and including programmable antenna circuitry configured to switch between ISL and TT&C communications modes, in accordance with certain embodiments of the present disclosure.

FIG. 2 depicts a diagram of a system 200 including one of the satellites 102 of the system 100 of FIG. 1 and including programmable antenna circuitry configured to switch between ISL and TT&C communications modes, in accordance with certain embodiments of the present disclosure. The satellite 102 may include a software-defined radio (SDR) 202, which may include a plurality of inputs and a plurality of outputs, and which may be configured to send or receive radio frequency signals. The SDR 202 may be coupled to multiple front-end circuits 204, each of which may be coupled to a corresponding one or more antenna circuits 206. The SDR may be programmed to instantiate a TT&C modem, or an ISL modem, or both.

Each antenna circuit 206 may include a transmit/receive antenna 208 that may be used to send and receive radio frequency (RF) signals. In some implementations, the transmit receive antenna 208 may be configured to transmit and receive RF signals (TT&C transmit signals, ISL receive signals, and ISL transmit signals) within a frequency range of approximately 2,200 MHz to 2,290 Megahertz (MHz). Each antenna circuit 206 may also include a standalone receive antenna 210 that may be configured to receive RF signals (TT&C receive signals) within a frequency range of approximately 2,025 to 2,110 MHz.

The satellite 102 may include front-end circuits including a front-end circuit 204 for each of the antenna circuits 206. In this implementation, the satellite 102 may include a number N of antenna circuits 206 and a corresponding number N of front-end circuits 204. Each of the front-end circuits 204 may include a transmit path that may provide TT&C signals or ISL signals, depending on the operating mode (TT&C or ISL). The transmit path may include an amplifier 212(1) including an input coupled to an output of the SDR 202 and an output coupled to an input of a filter 214(1). The filter 214(1) may include an output coupled to a first node of a switch 216, which may have a second node coupled to an ISL receive path and a third node coupled to the transmit/receive antenna 208. The switch 216 may be controlled to selectively couple one of the transmit path or the receive path to the transmit/receive antenna 208.

The receive path may include an amplifier 212(2) that includes an input coupled to the second node of the switch 216 and an output coupled to an input of a filter 214(2). The filter 214(2) may include an output coupled to a first input of a two-to-one (2:1) multiplexer 218, which includes a second input that is coupled to a TT&C receive path and an output that is coupled to an input of the SDR 202.

The TT&C receive path may include an amplifier 212(3) including an input coupled to the receive antenna 210 and an output coupled to an input of a filter 214(3). The filter 214(3) may include an output coupled to the second input of the 2:1 multiplexer 218. The 2:1 multiplexer 218 may be configured to selectively couple one of the ISL receive path or the TT&C receive path to the input of the SDR 202.

Each front-end circuit 204 may be coupled to an output and an input of software defined radio 202. A first front-end circuit 204(1) may be coupled to a first output and a first input of the SDR 202. A second front-end circuit 204(2) (not shown) may be coupled to a second output and a second input of the SDR 202, and so on.

In this example, when a path is not in use, the corresponding amplifiers 212 and filters 214 may be powered off. By enabling the switch 218 to couple the TT&C receive path (output of the filter 214(3)) to the input of the SDR 202, the front-end circuit 204 may be configured to support the TT&C communication mode in which the satellite 102 may communicate directly with a ground base station 106. By enabling the switch 218 to couple the ISL receive path (output of the filter 214(2)) to the input of the SDR 202, the front-end circuit 204 may be configured to support the ISL communication mode in which the satellite 102 may communicate directly with other satellites 102 in the constellation.

In some implementations, the satellite 102 may include one or more sensor circuits 220. The sensor circuits 220 are shown in dashed lines because they may be distributed in the antenna circuits 206, the front-end circuits 204, associated with other circuitry, or any combination thereof. In some implementations, the one or more sensor circuits 220 may include motion sensors, gyroscopic sensors, accelerometers, temperature sensors, voltage sensors, current sensors, other sensors, or any combination thereof. In an example, the one or more sensor circuits 220 may be configured to monitor the outputs of the antenna 210. If the front-end circuit 204 is configured for ISL communications, the front-end circuitry 204 coupled to the antenna 210 (i.e., the amplifier 212(3), the filter 214(3), and other circuitry in the TT&C receive path) may be inactive. If the sensors 220 detect a change in the power level at the output of the antenna 210, the change in power levels may be indicative of receipt of a TT&C signal. Additionally, the sensor circuits 220 may determine motion of the satellite 102, which motion may be indicative of stability or tumbling.

By sharing the transmit functionality of the transmit/receive antenna 208 for both the ISL and TT&C communication modes, the size of the front-end circuitry 204 and the antenna circuits 206 may be relatively small, making it possible to include multiple transmit circuits 206 and multiple front-end circuits 204 on the satellite 102. In some implementations, the three-dimensional 4pi-steradian coverage may be significantly enhanced by positioning multiple antenna circuits 206 and associated front-end circuits 204 around the housing of the satellite 102. An example of a satellite 102 with distributed circuits is depicted in FIG. 3, for illustrative purposes.

Figure 3:
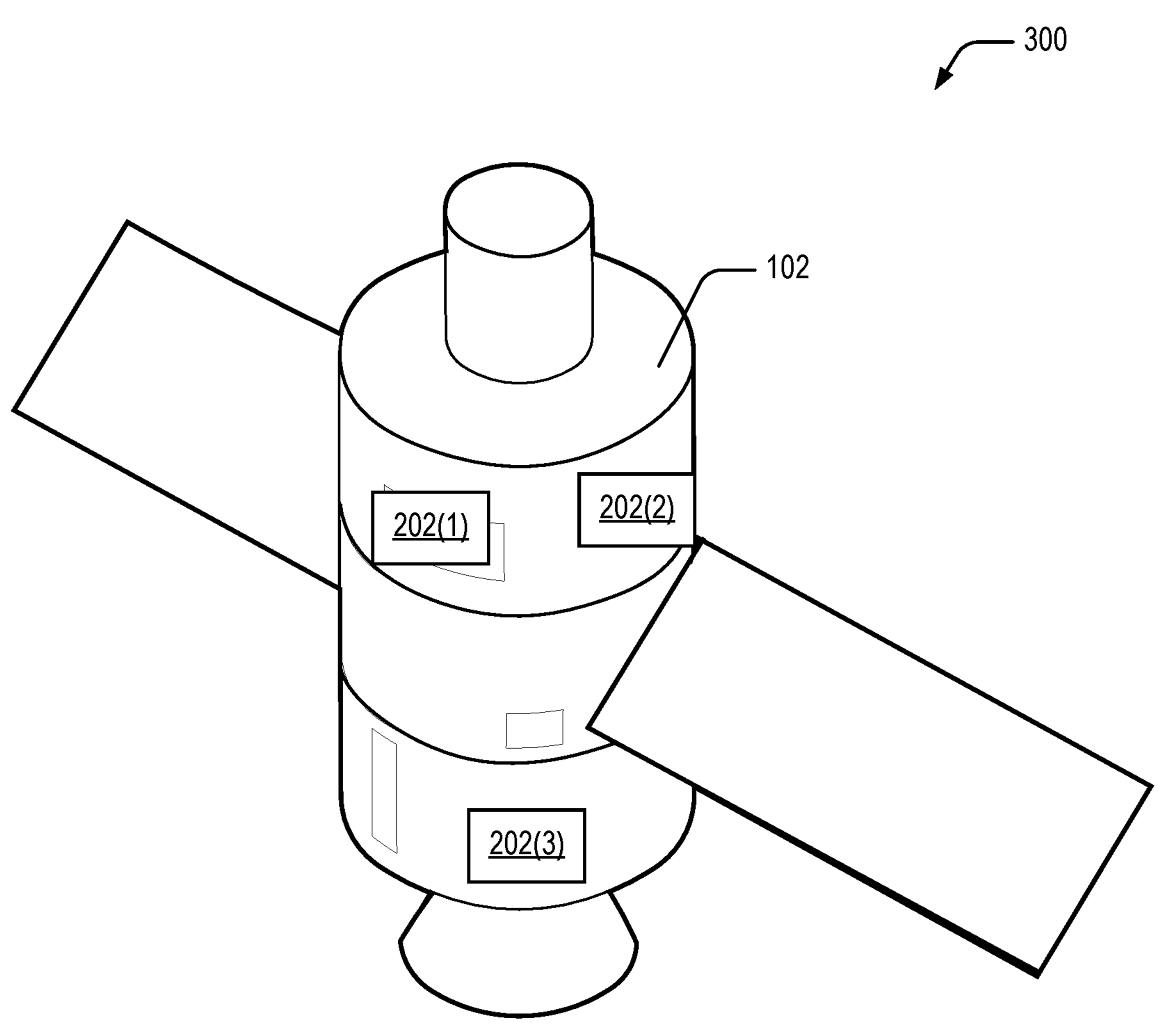
FIG. 3 depicts a diagram of a satellite of the systems of FIGS. 1 and 2 with a plurality of programmable antenna circuits distributed on the body of the satellite, in accordance with certain embodiments of the present disclosure.

FIG. 3 depicts a diagram of a system 300 including a satellite 102 of the systems 100 and 200 of FIGS. 1 and 2 with a plurality of programmable antenna circuits 206 distributed on the body of the satellite 102, in accordance with certain embodiments of the present disclosure. The system 300 may include a corresponding plurality of front-end circuits 204 (not shown) where each front-end circuit 204 corresponds to one of the antenna circuits 206 to provide the programmable functionality that enables switching between TT&C communication modes and ISL communication modes.

In some implementations, the front-end circuits 204 may be configured (by a controller or by the SDR 202 to provide TT&C communications during detumbling to increase the opportunities for TT&C communication while the satellite 102 is tumbling. After satellite stabilizes, the controller or SDR 202 may selectively configure one or more of the front-end circuits 204 to enable one or more of the corresponding antenna circuits 206 to use the ISL communication mode to support intersatellite communications while leaving others of the front-end circuits 204 and corresponding antenna circuits 206 to use the TT&C communication mode to support communications with ground base stations 106.

In this example, some of the front-end circuits 204 and the corresponding antenna circuits 206 may enable the ISL communication mode. In this mode, the ISL communication links 104 may provide two or more frequency domain division (FDD) channels or a single time division duplexing (TDD) channel to support establishing a mesh communication architecture with ISLs 104 establishing communications links between satellites 102 across relatively short distances. The other front-end circuits 204 and corresponding antenna circuits 206 may support TT&C communications links 108 having relatively low interference across relatively large distances.

While the illustrated example in FIG. 3 depicts three antenna circuits 206 distributed randomly across a surface of the satellite 102, the example is illustrative only and is not intended to be limiting. Any number of antenna circuits 206 and corresponding front-end circuits 204 may be distributed across all sides of the satellite 102 to enhance three-dimensional 4pi-steradian coverage by the satellite 102. Inclusion of a plurality of such programmable antenna circuits 206 may facilitate both intersatellite communications and satellite to ground communications to enable sparse or dense satellite constellations.

Figure 4:
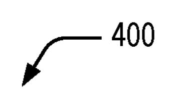
FIG. 4 depicts a frequency diagram depicting TT&C transmit and receive frequency bands and ISL transmit and receive frequency bands, in accordance with certain embodiments of the present disclosure.
Figure 4:
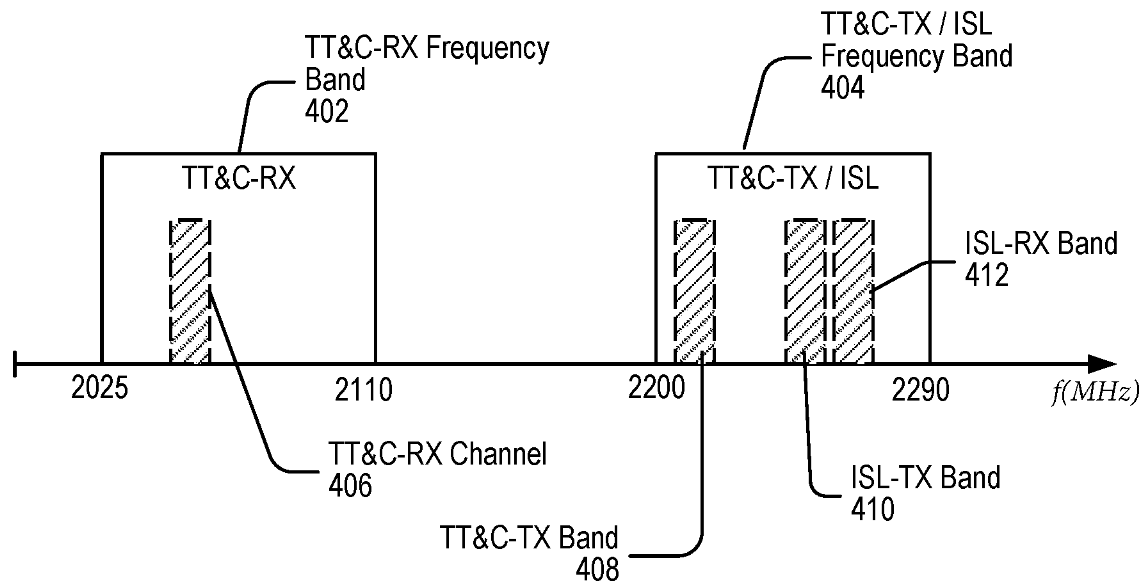

FIG. 4 depicts a frequency diagram 400 depicting TT&C transmit and receive frequency bands and ISL transmit and receive frequency bands, in accordance with certain embodiments of the present disclosure. In the illustrated example, the diagram 400 includes a TT&C receive frequency band 402 that extends from approximately 2,025 MHz to approximately 2,110 MHz. The diagram 400 also includes a TT&C transmit/ISL frequency band 404 that extends from approximately 2,200 MHz to approximately 2,290 MHz.

The diagram 400 depicts a TT&C receive channel 406 within the TT&C receive frequency band 402 and a TT&C transmit channel 408 within the TT&C transmit/ISL frequency band 404. When the front-end circuit 204 is configured for TT&C communication mode, the front-end circuit 204 may receive signals in the TT&C receive frequency band 402 using the receive antenna 210, which may be tuned and calibrated to receive signals within the TT&C receive frequency band 402. The SDR 202 may send signals in the TT&C transmit/ISL frequency band 404 via the front-end circuit 204 and using the transmit/receive antenna 208 of the antenna circuit 206, which may be tuned and calibrated to send and receive signals within the TT&C transmit/ISL frequency band 404.

When the antenna circuit 206 and the front-end circuit 204 are configured for ISL communications, the SDR 202 may send and receive signals from the transmit/receive antenna 208 of the antenna circuit 206. The ISL signals may be sent via the ISL transmit channel 410 and may be received via the ISL receive channel 412. The channelization is only an example. In other implementations, there may be one TT&C receive channel in the TT&C-Rx frequency band 402, one TT&C transmit channel and one Time Division Duplex (TDD) bi-directional ISL channel in the TT&C-Tx/ISL frequency band 404. In another implementation, there may be more than two Frequency Division Duplex (FDD) ISL channels in the TT&C-Tx/ISL frequency band 404.

Figure 5:
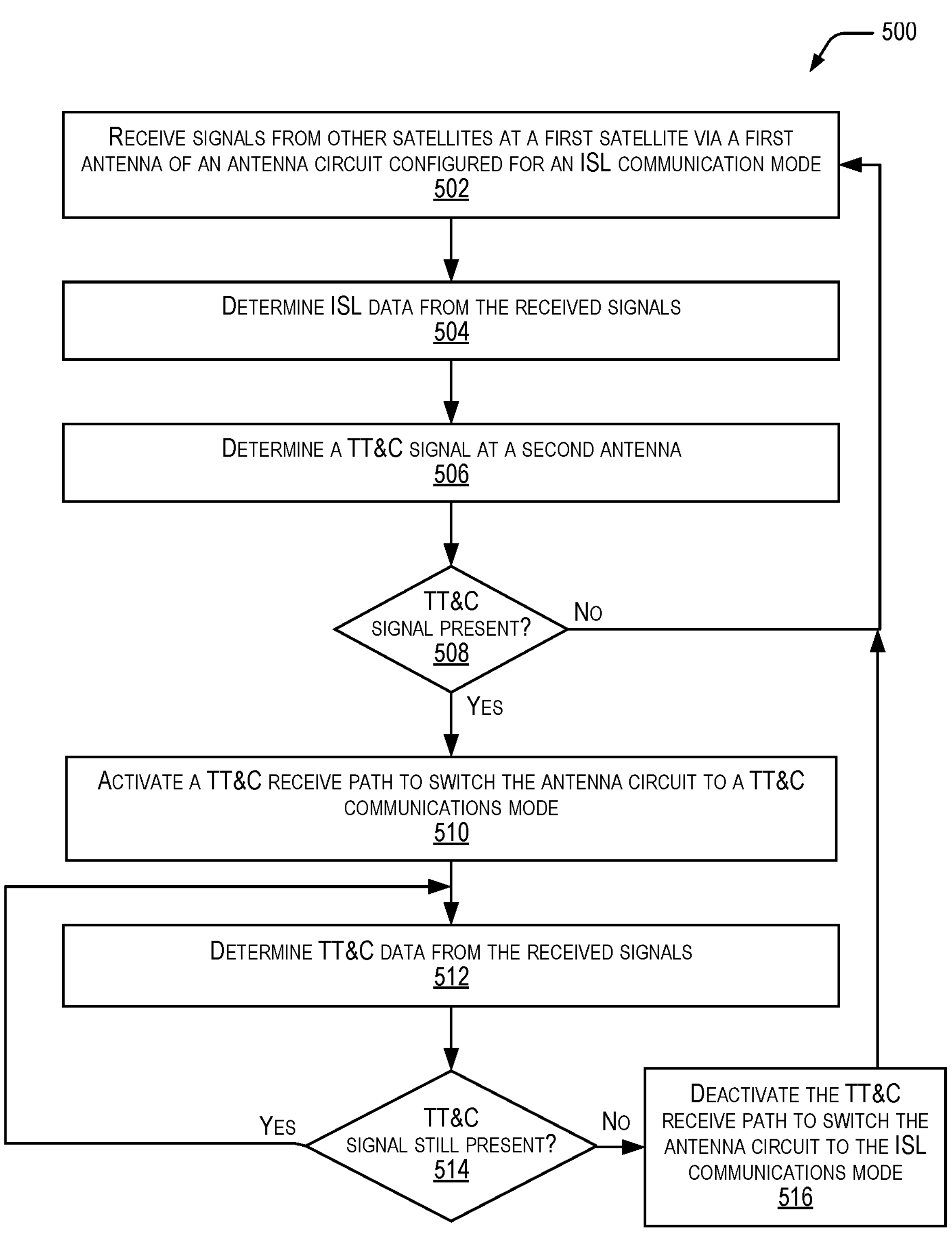
FIG. 5 depicts a flow diagram of a method of switching between TT&C and ISL functionality, in accordance with certain embodiments of the present disclosure.

FIG. 5 depicts a flow diagram of a method 500 of switching between TT&C and ISL functionality, in accordance with certain embodiments of the present disclosure. In the following discussion, for ease of discussion, the method 500 focuses on the TT&C and ISL receive operations, since the transmit operations for both modes are the same.

At 502, the method 500 may include receiving signals from other satellites at a first satellite 102 via an antenna circuit 206 configured for an ISL communication mode. In this example, the antenna circuit 206 and the front-end circuit 204 are configured for sending and receiving data via the transmit/receive antenna 208.

At 504, the method 500 may include determining ISL data from the received signals. Signals received at the transmit receive antenna 208 may be amplified by the amplifier 212(2), filtered using the filter 214(2), and selectively provided to the SDR 202 via the 2:1 multiplexer 218. Depending on the implementation, the analog front-end 204 or the antenna circuit 206 may include an analog-to-digital converter (not shown) to convert the received signals to digital data before providing the received data to the amplifier 212(2).

At 506, the method 500 may include determining a TT&C signal at a second antenna 210. In some implementations, power may be detected by one or more sensors coupled to the antenna 210 of the antenna circuit 206. Since the antenna 210 is configured to receive signals in the TT&C frequency band 402, power associated with the antenna 210 may be indicative of the presence of a TT&C data signal from a ground base station 106.

At 508, if a TT&C signal is not present on the second antenna 210, the method 500 may include receiving signals from other satellites at the first satellite 102 via an antenna circuit 206 configured for an ISL communication mode. In other words, the configuration of the front-end circuitry 204 remains unchanged, so the amplifier 212(3) and the filter 214(3) may be powered down and the TT&C receive path may remain disabled. In this instance, the 2:1 multiplexer 218 continues to select the ISL receive path to provide the output from the filter 214(2) to the input of the SDR 202.

Otherwise, at 508, if the TT&C signal is present on the second antenna 210, the method 500 may include activating a TT&C receive path to switch the antenna circuit to a TT&C communications mode, at 510. The TT&C receive path may be activated by turning on power to the amplifier 212(3) and to the filter 214(3) and by switching the multiplexer 218 so that the output of the filter 214(3) is provided to the input of the SDR 202. At the same time, the amplifier 212(2) and the filter 214(2) may be powered down, disabling the ISL receive path. In this configuration, the antenna 208 may transmit TT&C signals to the ground base station 106 and the antenna 210 may receive TT&C signals from the ground base station 106.

At 512, the method 500 may include determine TT&C data from the received signals. The front-end circuit 204 may receive the TT&C signal from the antenna 210, amplify the signal using the amplifier 212(3), filter the signal using the filter 214(3), and provide the output of the filter to the SDR 202 via the multiplexer 218. Depending on the implementation, the TT&C signal may be converted to a digital signal by an analog-to-digital converter (ADC) in the antenna circuit 206 or in the analog front-end 204 before the amplifier 212(3).

At 514, if the TT&C signal is still present, the method 500 returns to 512 to determine the TT&C data from the received signals. In other words, the configuration of the multiplexer 218 (providing the output of the filter 214(3) to the input of the SDR 202) remains unchanged and the amplifier 212(2) and the filter 214(2) remain in a low power or no power state.

Otherwise, if the TT&C signal is not present at 514, the method 500 may include deactivating the TT&C receive path to switch the antenna circuit 206 to the ISL communications mode, at 516. In this example, the amplifier 212(2) and the filter 214(2) may be turned on, the amplifier 212(3) and the filter 214(3) may be turned off, and the multiplexer 218 may be switched to provide the output of the filter 214(2) to the input of the SDR 202. The method 500 may then return to 502 to receive signals from other satellites at a first satellite 102 via an antenna circuit 206 configured for an ISL communication mode.

In the example of FIG. 5, the operating mode of a selected antenna circuit 206 and the associated front-end circuit 204 may be varied between ISL and TT&C communication modes based on the presence or absence of TT&C signals at the antenna 210. In the absence of TT&C signals at the antenna 210, the front-end circuit 204 may be configured to use the antenna 208 for both transmission and reception of ISL signals. When signals are detected at the antenna 210, the front-end circuit 204 may check for the presence of TT&C signals. If TT&C signals are detected, the front-end circuit 204 may switch to the TT&C communication mode, using the antenna 208 for transmission of TT&C signals while using the antenna 210 for reception of TT&C signals.

The presence or absence of a TT&C signal is not the only basis for switching between the ISL and TT&C communication modes. In some implementations, the system may be configured to switch between modes periodically, based on geophysical position, based on motion, or based on one or more other parameters. In an example, the system may be configured to switch between the communication modes based on motion of the satellite 102. During deployment, the satellite 102 may tumble for a period of time until the satellite 102 stabilizes. The system may be configured to selectively control the communication modes based on such motion. An example is described below with respect to FIG. 6. In other implementations, the system may be programmed to perform only TT&C communications or only ISL communications for extended periods of time with no switching.

Figure 6:
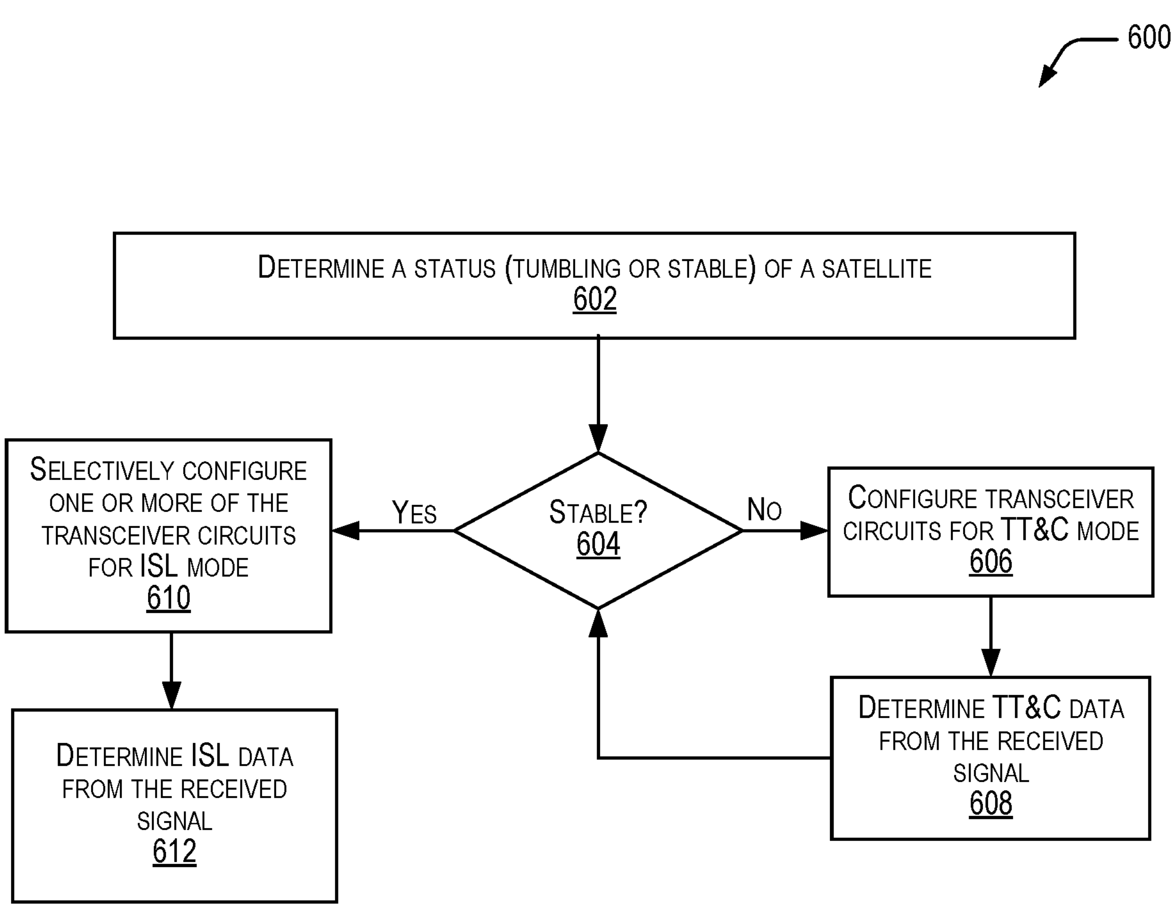
FIG. 6 depicts a flow diagram of a method of selectively configuring multiple programmable antenna circuits for one or more of a TT&C mode or an ISL mode, in accordance with certain embodiments of the present disclosure.

FIG. 6 depicts a flow diagram of a method 600 of selectively configuring multiple programmable antenna circuits 208 for one or more of a TT&C mode or an ISL mode, in accordance with certain embodiments of the present disclosure. In this example, the system may be configured to determine the state of the satellite 102 based on signals from the one or more sensors 220.

At 602, the method 600 may include determining a status (tumbling or stable) of a satellite 102. The systems on board the satellite 102 may include gyroscopic sensors, accelerometers, other motion sensors, and other sensors that may be configured to generate signals indicative of the orientation of the satellite 102 as well as rate of change and other indicators of rotational motion.

At 604, if the satellite 102 is not stable (as determined from the signals from the one or more sensors 220), the method 600 may include configuring the transceiver circuits (front-end circuit 204) for a TT&C communications mode, at 606. In this example, the receive path for the ISL communications may be disabled, and the receive path for the TT&C communications may be activated. Specifically, deactivating the receive path for the ISL communications may include turning off power to the amplifier 212(2) and the filter 214(2), controlling the switch 216 to couple the transmit path to the transmit/receive antenna 208, and configuring the multiplexer 218 to couple the output of the filter 214(3) to the software-based radio 202. At the same time, activating the receive path for the TT&C communications may include turning on power to the amplifier 212(3) and the filter 214(3).

At 608, the method 600 may include determining TT&C data from received signals. In this example, a signal from the antenna 210 may be provided to the amplifier 212(3), which may amplify the signal and provide it to the filter 214(3). The multiplexer 218 may couple the output of the filter 214(3) to the input of the SDR 202. The method 600 may then return to 604 to keep checking the stability of the satellite 102.

Returning to 604, if the satellite 102 is stable, the method 600 may include selectively configuring one or more of the transceiver circuits for an ISL communications mode, at 610. The satellite 102 may configure the front-end circuit 204 for the ISL communications mode by controlling the multiplexer 218 to direct the output of the filter 214(2) to the SDR 202. Additionally, the amplifier 212(3) and the filter 214(3) may be deactivated (powered down) while the amplifier 212(2) and the filter 214(2) may be activated. A switch 216 may be configured to couple the antenna 208 to the SDR 202 via the ISL transmit and receive paths.

At 612, the method 600 may include determining ISL data from the received signals. In this example, the signals received by the antenna 208 may be provided to the SDR 202. In some implementations, the front-end circuit 204 or the antenna circuit 206 may include an analog-to-digital converter configured to produce data related to the received signals, which data may be amplified by the amplifier 212(2) and filtered by the filter 214(2) before the multiplexer 218 directs the data to the SDR 202.

In some implementations, the satellite 102 may include a plurality of front-end circuits 204 and associated antenna circuits 206. Some of the front-end circuits 204 may be configured for ISL communications while others of the front-end circuits 204 may be configured for TT&C communications.

In conjunction with the systems, methods, and circuits described above with respect to FIGS. 1-6, a satellite 102 may include a SDR 202, a front-end circuit 204, and an antenna circuit 206. The antenna circuit 206 may include a first antenna 208 configured to send TT&C or ISL signals and to receive ISL signals within a frequency band 404 corresponding to ISL communications and TT&C transmissions. The antenna circuit 206 may include a second antenna 210 configured to receive TT&C signals corresponding to TT&C signal reception within a frequency band 402. The front-end circuit 204 may be coupled to the antenna circuit 206 and the SDR 202. The front-end circuit 204 may include a transmit path for both ISL and TT&C communications through the front-end circuit 204 to the first antenna 208. The front-end circuit 204 may include a first receive path through the front-end circuit 204 that couples the antenna 208 to the SDR 202. The front-end circuit 204 may include a second receive path through the front-end circuit 204 that couples the antenna 210 to the SDR 202.

In a TT&C mode, the front-end circuit 204 may deactivate the amplifier 212(2) and the filter 214(2), may control the switch 216 to coupled the output of the filter 214(1) to the transmit/receive antenna 208, may activate the amplifier 212(3) and the filter 214(3), and may configure the switch 218 to couple the output of the filter 214(3) to the SDR 202. In an ISL mode, the front-end circuit 204 may activate the amplifier 212(2) and the filter 214(2), may deactivate the amplifier 212(3) and the filter 214(3), may configure the switch 218 to couple the output of the filter 214(2) to the SDR 202, and may control the switch 216 to send ISL signals to or receive ISL signals from the transmit/receive antenna 208. The deactivation of amplifiers 212 that are not needed for a particular link type reduces the overall power consumption of the satellite 102, and reduces potential RF interference to other subsystems in the satellite 102.

Although the present invention has been described with reference to preferred embodiments, workers skilled in the art will recognize that changes may be made in form and detail without departing from the scope of the invention.

What is claimed is:

1. A system comprises:

one or more satellites, wherein each satellite comprises:
- a software-defined radio (SDR) configured to provide data for transmission and to process received data;
- a plurality of antenna circuits, each antenna circuit including a first antenna configured to send and receive signals within a first frequency band and including a second antenna configured to receive signals within a second frequency band; and
- a plurality of front-end circuits, each front-end circuit coupled between the SDR and one of the plurality of antenna circuits, each front-end circuit including:
  - a switch including a first node and a second node and including a third node coupled to the first antenna;
  - a transmit path configured to couple an output of the SDR to the first node;
  - a first receive path including an input coupled to the second node and including a first output;
  - a second receive path including an input coupled to the second antenna and including a second output; and
  - a multiplexer including a first input coupled to the first output, a second input coupled to the second output, and an output coupled to the SDR; and
- wherein the switch and the multiplexer are controlled to configure the front-end circuit to provide one of intersatellite link (ISL) communications or telemetry, tracking, and control (TT&C) communications.

2. The system of claim 1, wherein the transmit path is used for both the ISL communications and the TT&C communications.

3. The system of claim 1, wherein the transmit path comprises:

a amplifier including an input coupled to an output of the SDR and including an output;

a filter including an input coupled to the output of the amplifier and including an output; and a switch including a first node coupled to the output of the filter, a second node configured to couple to the first receive path, and an output coupled to the first antenna, the switch is configured to couple the first node to the output.

4. The system of claim 1, wherein the first receive path comprises:

a switch including a first node coupled to the transmit path, a second node, and a third node coupled to the first antenna, the switch is configured to selectively couple the third node to one of the first node or the second node;

a first amplifier including an input coupled to the second node and including an output; and a first filter including an input coupled to the output of the first amplifier and including an output coupled to the first input of the multiplexer.

5. The system of claim 4, wherein the second receive path comprises:

a second amplifier including an input coupled to the second antenna and including an output; and a second filter including an input coupled to the output of the second amplifier and including an output coupled to the second input of the multiplexer.

6. The system of claim 5, wherein, in an ISL communications mode:

the multiplexer is configured to couple the first input of the multiplexer to the SDR; and the switch is configured to couple the first node to the third node during ISL transmission and to couple the second node to the third node during ISL reception.

7. The system of claim 5, wherein, in a TT&C communications mode:

the multiplexer is configured to couple the second input of the multiplexer to the SDR; and the switch is configured to couple the first node to the third node.

8. The system of claim 1, wherein amplifiers within one of the first receive path or the second receive path that are not being utilized for communication are powered off to reduce overall power consumption and to reduce radio frequency interference with other circuits or subsystems.

9. A satellite comprising:

a software-defined radio (SDR) configured to provide data for transmission and to process received data;

a plurality of antenna circuits, each antenna circuit including a first antenna and including a second antenna; and a plurality of front-end circuits, each front-end circuit coupled between the SDR and one of the plurality of antenna circuits, each front-end circuit including:

a transmit path including an input coupled to an output of the SDR and an output configured to couple to the first antenna;

a first receive path including an input configured to couple to the first antenna and an output configured to couple to the SDR; and a second receive path including an input coupled to the second antenna and including an output configured to couple to the SDR; and wherein each front-end circuit is configured to selectively enable one of the first receive path for inter-satellite link (ISL) communications or the second receive path for telemetry, tracking, and control (TT&C) communications.

10. The satellite of claim 9, further comprising one or more sensors configured to determine a stability parameter corresponding to stability of the satellite, wherein the front-end circuit is configured to enable the second receive path when the stability parameter is indicative of tumbling.

11. The satellite of claim 9, further comprising one or more sensors configured to determine a stability parameter corresponding to stability of the satellite, wherein the front-end circuit is configured to enable the first receive path when the stability parameter is indicative of stability.

12. The satellite of claim 9, wherein the transmit path comprises:

an amplifier including an input coupled to an output of the SDR and including an output;

a filter including an input coupled to the output of the amplifier and including an output; and a switch including a first node coupled to the output of the filter, a second node configured to couple to the first receive path, and an output coupled to the first antenna, the switch is configured to couple the first node to the output during transmission.

13. The satellite of claim 9, wherein the first receive path comprises:

a switch including a first node coupled to the transmit path, a second node, and a third node coupled to the first antenna, the switch is configured to selectively couple the third node to one of the first node or the second node;

a first amplifier including an input coupled to the second node and including an output;

a first filter including an input coupled to the output of the first amplifier and including an output; and a multiplexer including a first input coupled to a first input of the multiplexer, a second input configured to couple to an output of the second receive path, and an output coupled to the SDR.

14. The satellite of claim 13, wherein the second receive path comprises:

a second amplifier including an input coupled to the second antenna and including an output; and a second filter including an input coupled to the output of the second amplifier and including the output coupled to the second input of the multiplexer.

15. The satellite of claim 14, wherein, in an ISL communications mode:

the transmit path is active;

amplifiers in the second receive path are powered off to reduce overall power consumption and to reduce radio frequency interference with other circuits or subsystems;

the multiplexer is configured to couple the first input of the multiplexer to the SDR; and the switch is configured to couple the first node to the third node during ISL transmission and to couple the second node to the third node during ISL reception.

16. The satellite of claim 14, wherein, in a TT&C communications mode:

the transmit path is active;

amplifiers in the first receive path are powered off to reduce overall power consumption and to reduce radio frequency interference with other circuits or subsystems;

the switch is configured to couple the first node to the third node; and the multiplexer is configured to couple the second input of the multiplexer to the SDR.

17. A system comprises:

a plurality of satellites configured to selectively communicate with one another via intersatellite links (ISL) communication links and with a ground base station using a telemetry, tracking, and control (TT&C) communications link, wherein each satellite comprises:

a signal processing circuit;

an antenna circuit including a first antenna configured to send and receive signals within a first frequency band and a second antenna configured to receive signals within a second frequency band;

a front-end circuit comprising:

a transmission path including:

a first amplifier including an input coupled to an output of the signal processing circuit and including an output; and a first filter including an input coupled to the output of the first amplifier and including an output;

a first receive path including:

a second amplifier including an input and including an output;

a second filter including an input coupled to the output of the second amplifier and including an output;

a switch including a first node coupled to the output of the first filter, a second node coupled to the input of the second amplifier, and a third node coupled to the first antenna;

a multiplexer including a first input coupled to the output of the second filter, a second input, and an output coupled to an input of the signal processing circuit; and a second receive path including:

a third amplifier including an input coupled to the second antenna and including an output;

a third filter including an input coupled to the output of the third amplifier and including an output coupled to the second input of the multiplexer;

wherein the switch and the multiplexer are controlled to selectively disable one of the first receive path or the second receive path to provide one of a telemetry, tracking, and control (TT&C) mode or an intersatellite link (ISL) mode.

18. The system of claim 17, wherein each satellite further comprises one or more sensors configured to determine a stability parameter corresponding to stability of the satellite, wherein:

the front-end circuit is configured to enable the second receive path when the stability parameter is indicative of tumbling; and the front-end circuit is configured to enable the first receive path when the stability parameter is indicative of stability.

19. The system of claim 17, wherein one of the second amplifier within the first receive path or the third amplifier within the second receive path are powered off to reduce overall power consumption and to reduce radio frequency interference with other circuits or subsystems when the one of the first receive path or the second receive path are not in use.

20. The system of claim 18, wherein the plurality of satellites comprises:

a mesh network configured to communicate with one another using the ISL communication links; and wherein one or more of the plurality of satellites are configured to communicate with one or more ground base stations via a TT&C communications link; and wherein a first satellite of the plurality of satellites has no direct connection to a ground base station and may communicate with at least one of the one or more ground base stations through one or more other satellites of the mesh network.

* * * * *